(12) United States Patent
Hashimoto et al.

(10) Patent No.: US 9,333,782 B1
(45) Date of Patent: May 10, 2016

(54) CONTROL UNIT, CONTROL SYSTEM, CONTROL METHOD, AND RECORDING MEDIUM

(71) Applicant: CANON KABUSHIKI KAISHA, Tokyo (JP)

(72) Inventors: Yasuhiko Hashimoto, Yokohama (JP); Kevin F Piazza, Santa Ana, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/706,882

(22) Filed: May 7, 2015

(51) Int. Cl.
*B41J 29/38* (2006.01)

(52) U.S. Cl.
CPC ........................................ *B41J 29/38* (2013.01)

(58) Field of Classification Search
USPC ............ 347/6, 14, 16, 19; 358/1.9, 1.14, 1.16
See application file for complete search history.

(56) References Cited

U.S. PATENT DOCUMENTS

| | | | | |
|---|---|---|---|---|
| 6,351,320 B1 * | 2/2002 | Shin | ........................ | G06K 15/00 358/1.16 |
| 2010/0207972 A1 * | 8/2010 | Kawai | .................... | H04N 1/482 347/6 |
| 2015/0331639 A1 * | 11/2015 | Piazza | ..................... | G06F 3/121 358/1.14 |

FOREIGN PATENT DOCUMENTS

JP 2013-214269 A 10/2013

* cited by examiner

*Primary Examiner* — Lam Nguyen

(74) *Attorney, Agent, or Firm* — Canon U.S.A., Inc. IP Division

(57) ABSTRACT

A control system for controlling execution of calibration on a printing apparatus includes an acquiring unit configured to acquire, from a printing apparatus to be controlled, first sheet type information representing information regarding a common calibration sheet type used when the most recent common calibration is executed, where a result of common calibration executed using the common calibration sheet type is applied to other sheet types, a determination unit configured to determine whether the state of the printing apparatus for the first sheet type satisfies a predetermined condition in accordance with a print volume of the printing apparatus, and a control unit configured to cause the printing apparatus to execute calibration using the first sheet type if the determination unit determines that the predetermined condition for the first sheet type is satisfied.

11 Claims, 11 Drawing Sheets

| ~5000 SHEET ID | ~5001 CALIBRATION ELIGIBLE PROPERTY | ~5002 SHEET NAME | ~5003 CALIBRATION TARGET CREATION DATE AND TIME |
|---|---|---|---|
| ID_A | COMMON | Paper_Name_A | 04/05/2014 10:00:00 |
| ID_B | COMMON | Paper_Name_B | 04/05/2014 10:00:00 |
| ID_C | UNIQUE | Paper_Name_C | 01/23/2015 13:45:00 |
| ID_D | INELIGIBLE | Paper_Name_D | – |

| ~6000 SHEET ID | ~6001 SHEET TYPE IN CALIBRATION | ~6002 CALIBRATION EXECUTION DATE AND TIME | ~6003 CALIBRATION STATE |
|---|---|---|---|
| ID_Common | ID_A | 02/03/2015 10:00:00 | 95 |
| ID_A | ID_A | 02/03/2015 10:00:00 | 95 |
| ID_B | ID_B | 02/01/2015 10:00:00 | 95 |
| ID_C | – | – | – |
| ID_D | – | – | – |

FIG. 5

| SHEET ID /5000 | CALIBRATION ELIGIBLE PROPERTY /5001 | SHEET NAME /5002 | CALIBRATION TARGET CREATION DATE AND TIME /5003 |
|---|---|---|---|
| ID_A | COMMON | Paper_Name_A | 04/05/2014 10:00:00 |
| ID_B | COMMON | Paper_Name_B | 04/05/2014 10:00:00 |
| ID_C | UNIQUE | Paper_Name_C | 01/23/2015 13:45:00 |
| ID_D | INELIGIBLE | Paper_Name_D | – |

FIG. 6

| SHEET ID /6000 | SHEET TYPE IN CALIBRATION /6001 | CALIBRATION EXECUTION DATE AND TIME /6002 | CALIBRATION STATE /6003 |
|---|---|---|---|
| ID_Common | ID_A | 02/03/2015 10:00:00 | 95 |
| ID_A | ID_A | 02/03/2015 10:00:00 | 95 |
| ID_B | ID_B | 02/01/2015 10:00:00 | 95 |
| ID_C | – | – | – |
| ID_D | – | – | – |

FIG. 10

| PRINTER NAME ~10001 | PRODUCT NAME ~10002 | CALIBRATION STATE ~10003 | CALIBRATION EXECUTION DATE AND TIME ~10004 | SCHEDULE ~10005 | DATE AND TIME OF UPDATE ~10006 | COMMON CALIBRATION SHEET TYPE ~10007 | SHEET INFORMATION CHECK ~10008 |
|---|---|---|---|---|---|---|---|
| Name_A | Printer_A | Level 3 (95%) | 06/10/2014 13:05:10 | AUTO | 07/01/2014 13:05:10 | SHEET A | OK |
| Name_B | Printer_B | OK (10%) | 06/10/2014 13:05:10 | AUTO | 07/01/2014 13:05:15 | SHEET A | MISMATCH |
| Name_C | Printer_C | Level 2 (87%) | 06/10/2014 13:05:10 | AUTO | 07/01/2014 13:05:20 | SHEET A | OK |
| Name_D | Printer_D | Level 1 (82%) | 06/10/2014 13:05:10 | AUTO | 07/01/2014 13:05:25 | SHEET A | OK |

FIG. 11

| CHECK | PRINTER NAME 11001 | PRODUCT NAME 11002 | Level 1 NOTICE: ON 11003 | Level 2 NOTICE: ON 11004 | Level 3 NOTICE: ON 11005 | EXPIRATION NOTICE: ON 11009 | AUTO CALIBRATION 11006 | SCHEDULE 11007 | DESTINATION ADDRESS 11008 |
|---|---|---|---|---|---|---|---|---|---|
| ☐ | Name_A | Printer_A | 80 | 85 | 90 | ON | ON | AUTO | Email_Address_1 |
| ☐ | Name_B | Printer_B | 80 | 85 | 90 | OFF | ON | AUTO, 08/01/2014 10:00:00 | Email_Address_2 |
| ☐ | Name_C | Printer_C | 80 | 85 | 90 | OFF | ON | AUTO | – |
| ☐ | Name_D | Printer_D | 80 | 85 | 90 | OFF | ON | AUTO | – |

11000

CONTROL UNIT, CONTROL SYSTEM, CONTROL METHOD, AND RECORDING MEDIUM

BACKGROUND OF THE INVENTION

1. Field of the Invention

The present invention relates to a control unit, a control system, a control method, and a program for keeping colors used by an image forming apparatus unchanged.

2. Description of the Related Art

In image forming apparatuses, such as printers, the ink ejection volume of a print head varies over time due to, for example, aging. Accordingly, even when images are formed on printing media, such as paper sheets, on the basis of the same image data, the colors of the images may be different from each other. To present the same colors on the printing media by correcting the input image data, a technique called "calibration" is employed. The term "calibration" refers to measuring the colors of a color patch after printing the color patch on a printing medium using the print head and performing color correction on the input image data on the basis of the result of measurement.

To manage the color correction states of a plurality of image forming apparatuses, a management system that presents the color correction state for a sheet specified by a user has been developed (refer to, for example, Japanese Patent Laid-Open No. 2013-214269).

According to the management system, the user needs to examine the color correction state for each of the types of sheet used for an operation and instruct the management system to perform calibration using a list of sheets each time the user examines the color correction state.

Accordingly, an aspect of the present invention provides a control unit, a control system, a control method, and a program capable of performing calibration without interference with the operations performed by an operator and other users.

SUMMARY OF THE INVENTION

To address the above-described issue, a control system for controlling execution of calibration on a printing apparatus is provided. The control system includes an acquiring unit configured to acquire, from a printing apparatus to be controlled, first sheet type information representing information regarding a common calibration sheet type used when the most recent common calibration is executed, where a result of common calibration executed using the common calibration sheet type is applied to other sheet types, a determination unit configured to determine whether a state of the printing apparatus for the first sheet type satisfies a predetermined condition in accordance with a print volume of the printing apparatus, and a control unit configured to cause the printing apparatus to execute calibration using the first sheet type if the determination unit determines that the predetermined condition for the first sheet type is satisfied.

Further features of the present invention will become apparent from the following description of exemplary embodiments with reference to the attached drawings.

BRIEF DESCRIPTION OF THE DRAWINGS

FIG. 5 illustrates an example of sheet information stored in a sheet information storage unit according to the first exemplary embodiment.

FIG. 6 illustrates an example of calibration information stored in a calibration information storage unit according to the first exemplary embodiment.

FIG. 10 illustrates an example of data stored in a printing apparatus DB and displayed on a display according to the first exemplary embodiment.

FIG. 11 illustrates an example of data stored in the printing apparatus DB and edited on the display according to the first exemplary embodiment.

DESCRIPTION OF THE EMBODIMENTS

Figure 1:
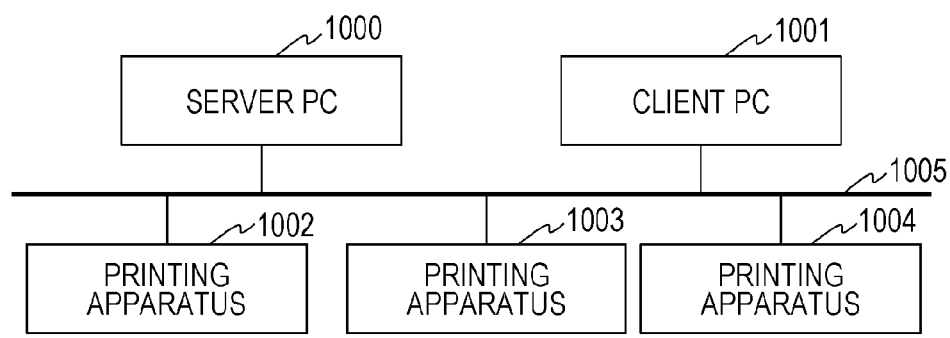
FIG. 1 illustrates an example of the network connection configuration of a control system according to a first exemplary embodiment.

Exemplary embodiments of the present invention are described below with reference to the accompanying drawings. It should be understood that the scope of the invention is not limited to the following embodiments. In addition, all of combinations of the features described in the embodiments are not necessarily needed for the invention.

A control system according to the present exemplary embodiment is a calibration management system for keeping the color of images printed by a plurality of printing apparatuses unchanged. The control system monitors the state of calibration of each of the printing apparatuses and remotely performs calibration on each of the printing apparatuses as needed.

To perform calibration, each of the printing apparatus prints a patch on the basis of patch data prestored in the printing apparatus, measures a printed sheet using a density sensor mounted in the printing apparatus, and measures the characteristic of a print head using the measurement result of the printed sheet. In this manner, the printing apparatus determines a correction value that makes the measurement result of the print head the same as target data (a target value). For example, the ink ejection volume of the print head is determined on the basis of the determined correction value.

In calibration, a sheet suitable for common calibration, that is, a sheet having a type that can appropriately reflect the characteristic of a print head is referred to as a "common calibration eligible sheet". Among common calibration eligible sheets, a sheet of a type that can apply the result of calibration to a sheet of another type is referred to as a "common calibration sheet". For example, a user can specify a common calibration sheet using a client PC 1001. Hereinafter, calibration performed using a common calibration sheet is referred to as "common calibration". By applying the result of calibration obtained through the common calibration to the other sheets, the color for the other sheet can be kept unchanged.

A sheet that is not suitable for common calibration but allows calibration is referred to as a "unique calibration sheet". Hereinafter, calibration performed using a unique calibration sheet is referred to as "unique calibration". If unique calibration has been performed using a unique calibration sheet, the result of calibration obtained through common calibration is not applied to the unique calibration sheet. Instead, only the result of calibration obtained through unique calibration performed for the sheet is applied. However, if unique calibration has not been performed on a unique calibration sheet, the result of the common calibration is applied to the unique calibration sheet.

In addition, hereinafter, a sheet of a type that is not suitable for common calibration and unique calibration and that does not allow calibration to be performed is referred to as a "calibration ineligible sheet"

As described above, if common calibration is performed using a common calibration sheet, the result of the common calibration performed on the common calibration sheet is applied to sheets of other types. If calibration has not yet been performed on a common calibration eligible sheet, the result of common calibration performed on a common calibration sheet is applied to the common calibration eligible sheet. That is, for a common calibration eligible sheet, the result of calibration performed on the sheet is preferentially applied. If calibration has not been performed on the common calibration eligible sheet, the result of calibration performed on a common calibration sheet is applied.

By using the result of calibration performed on the common calibration sheet, an acceptable color can be provided for the calibration ineligible sheet. For calibration ineligible sheets, the result of the common calibration is applied at all times. The user can define a custom sheet on the basis of sheet information regarding the common calibration sheet and sheet information regarding the unique calibration sheet. For a custom sheet, the user can change the name of the sheet, the height of the print head, sheet feed adjustment, and the attraction force. In addition, by generating calibration target data for the custom sheet, the custom sheet can be changed to a unique calibration sheet.

According to the present exemplary embodiment, in each of a plurality of printing apparatuses to be monitored, calibration is performed using the above-described common calibration sheet and unique calibration sheet. Once common calibration is performed on some type of sheet, common calibration is continuously performed on a sheet of the same type. In addition, once unique calibration is performed on some type of sheet, unique calibration is continuously performed on a sheet of the same type. That is, once calibration is performed on some type of sheet, subsequent calibration is performed using a sheet of the same type.

FIG. 1 illustrates an example of the system configuration of the control system in a network environment.

As illustrated in FIG. 1, a server PC 1000 and a client PC 1001 can be connected to printing apparatuses 1002, 1003, and 1004 via a network 1005. The server PC 1000 monitors the state of each of the printing apparatuses 1002, 1003, and 1004. The server PC 1000 can instruct each of the printing apparatuses, which are target of monitoring, to start printing. Note that according to the present exemplary embodiment, three printing apparatuses are monitored. However, the number of printing apparatuses to be monitored is not limited to three. One or two or more than or equal to three printing apparatuses may be monitored.

Each of the printing apparatuses 1002 to 1004 is an inkjet printer that can print large size paper. While the present exemplary embodiment is described with reference to a plurality of inkjet printers that can print large size paper, the type of the printing apparatus is not limited thereto. For example, the present exemplary embodiment is applicable to a plurality of inkjet printers that can print normal size paper. In addition, hereinafter, description is made with reference to only the printing apparatus 1002, unless stated otherwise, since the printing apparatuses 1003 and 1004 have the same functions as the printing apparatus 1002, unless stated otherwise. The printing apparatus 1002 has a calibration function and can perform calibration that supports a variety of types of sheet. That is, for a common calibration sheet and a unique calibration sheet, the printing apparatus 1002 has target data for each of the sheet types and performs calibration on the basis of the target data.

Figure 4:
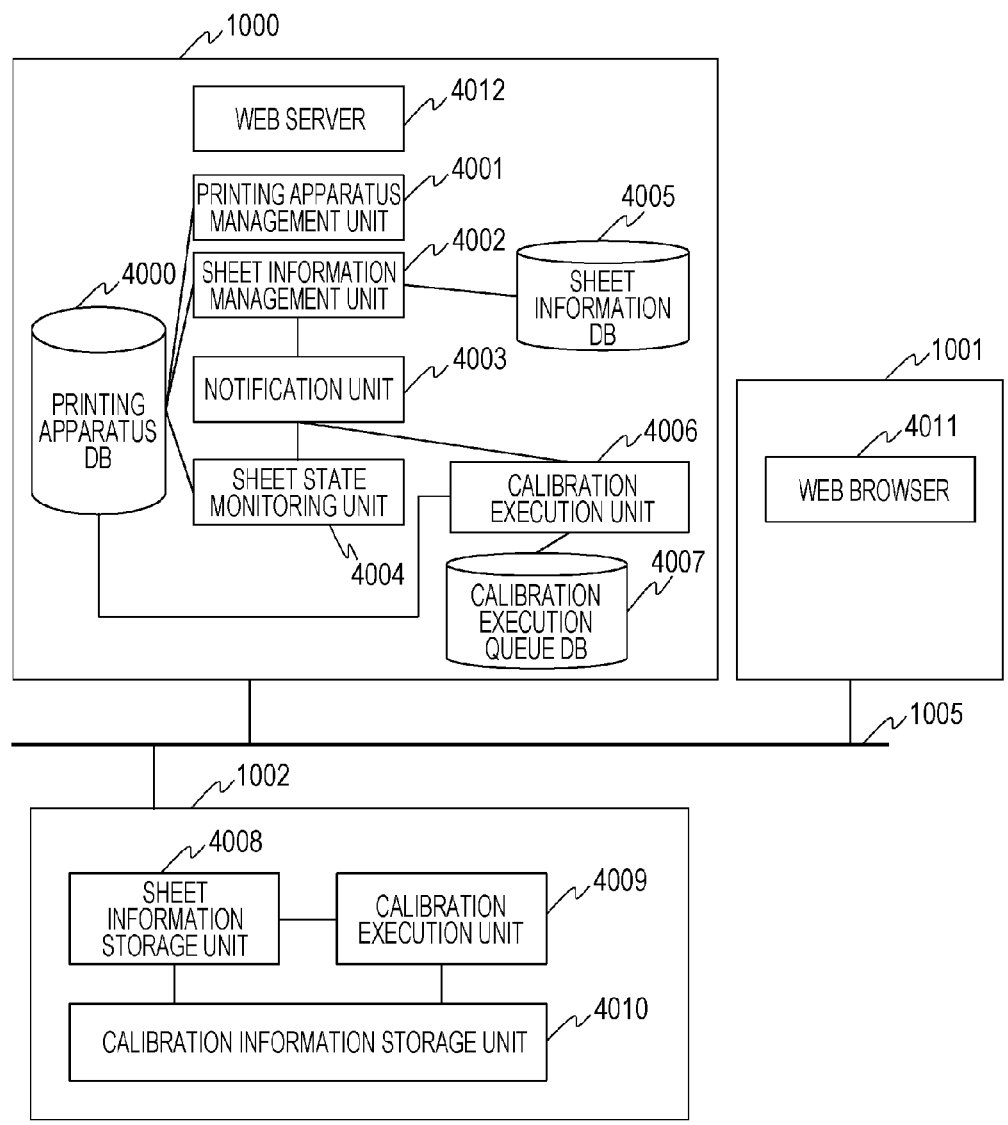
FIG. 4 illustrates an example of the functional blocks of the control system according to the first exemplary embodiment.

As illustrated in FIG. 4, in the server PC 1000, programs having a variety of functions for managing the printing apparatuses (1002 to 1004) are executed. The client PC 1001 includes a Web browser 4011 illustrated in FIG. 4. The web browser 4011 communicates with a Web server 4012 of the server PC 1000 and displays a Web page received from the web server 4012. In addition, the web server 4012 sends an instruction to the web server 4012. Note that the client PC 1001 can monitor the state of a common calibration sheet and set a monitoring condition of the common calibration sheet via the web browser 4011.

Figure 2:
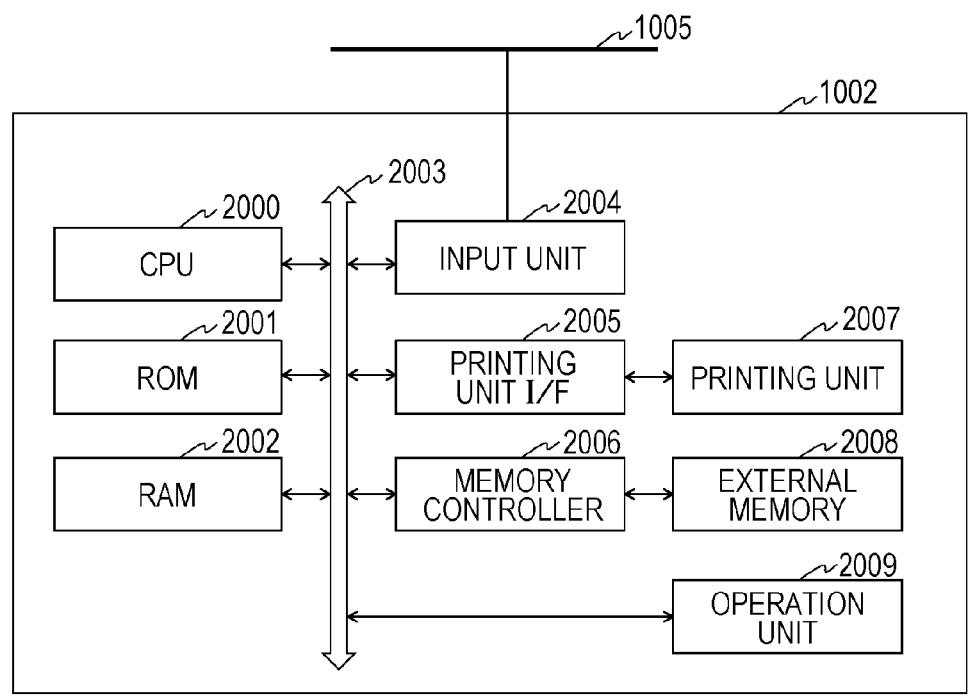
FIG. 2 illustrates an example of the hardware configuration of a printing apparatus according to the first exemplary embodiment.

FIG. 2 illustrates an example of the hardware configuration of the printing apparatus 1002. Note that since each of the printing apparatuses 1003 and 1004 has a configuration that is the same as that of the printing apparatus 1002, description of the configuration is not repeated. The printing apparatus 1002 is controlled by a central processing unit (CPU) 2000. The CPU 2000 performs its operation on the basis of a control program stored in a read only memory (ROM) for programs (e.g., a ROM 2001) or a control program stored in an external memory 2008. The CPU 2000 outputs, to a printing unit (a printer engine) 2007 connected to a printing unit interface (I/F) 2005 via a system bus 2003, an image signal serving as output information. The CPU 2000 can perform a communication process to communicate with the client PC 1001 and the server PC 1000 via an input unit 2004. Thus, the CPU 2000 can send information stored in the printing apparatus 1002 to the client PC 1001 and the server PC 1000. In addition, using the input unit 2004, the CPU 2000 can receive output data to be output to the printing unit 2007. A random access memory (RAM) 2002 serves as a main memory and a work area of the CPU 2000. The memory capacity of the RAM 2002 is expandable using an optional RAM connected to an expansion port (not illustrated). Note that the RAM 2002 can be used as, for example, an output information rastering area, and an environment data storage area. Accesses to the external memory 2008 (e.g., a hard disk drive (HDD) or an IC card) is controlled by a memory controller 2006. The external memory 2008 is optional. The external memory 2008 stores, for example, font data, an emulation program, form data, the information regarding a custom sheet, and sheet property information. The operation unit 2009 is a unit used by a user to operate the printing apparatus. The operation unit 2009 includes, for example, a panel to display a variety of types of information.

Figure 3:
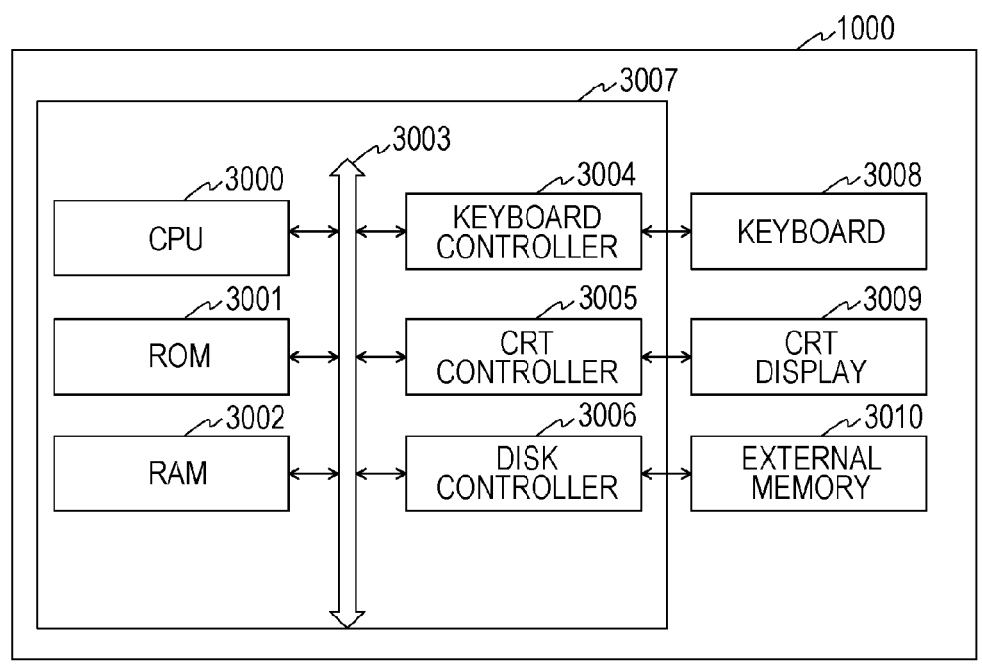
FIG. 3 illustrates an example of the hardware configuration of a server PC according to the first exemplary embodiment.

FIG. 3 is a block diagram of an example of the configuration of a computer of each of the server PC 1000 and the client PC 1001. According to the present exemplary embodiment, the server PC 1000 is described as an example. Note that the client PC 1001 has a similar configuration to that of the server PC 1000. However, the server PC 1000 and the client PC 1001 may have different configurations. A computer body 3007 includes a CPU 3000, a ROM 3001, a RAM 3002, a keyboard controller 3004, a CRT controller 3005, and a disk controller 3006.

The CPU 3000 loads a variety of programs, such as the control program, a system program, and an application program, from an external memory 3010 into the RAM 3002 via the disk controller 3006. Thereafter, the CPU 3000 executes the variety of programs loaded into the RAM 3002 and performs a variety of data processing. Note that the CPU 3000 may load the control program from the ROM 3001. The CPU 3000 may be formed as a dedicated circuit, such as an application specific integrated circuit (ASIC). The CPU 3000 is an example of a hardware circuit or a hardware processor. The RAM 3002 is expandable by using, for example, an optional RAM (not illustrated). Thus, the capacity of the RAM 3002 can be increased. The RAM 3002 is mainly used as a work area of the CPU 3000.

The keyboard controller 3004 controls key input from, for example, a keyboard 3008 or a pointing device (not illustrated). The cathode ray tube (CRT) controller 3005 controls a display operation performed on a CRT display 3009. The disk controller 3006 controls accesses to the external memory 3010. Examples of the external memory 3010 include a floppy disk (FD), a hard disk (HD), a compact disc read only memory (CD-ROM), a mini disc (MD), and a magneto-optical disc (MO).

The server PC 1000 includes the CRT display 3009 serving as a display unit. However, the display unit is not limited thereto.

Note that according to the present exemplary embodiment, the CPU 3000 controls the units connected to a main bus 3003 via the main bus 3003, unless stated otherwise.

The units of the functional blocks of the server PC 1000 and the client PC 1001 illustrated in FIG. 4 (described below) can be configured as program modules. In such a case, the program modules are stored in, for example, the external memory 3010, such as an FD, an HD, a CD-ROM, an MD, or an MO, of the server PC 1000. The program modules loaded into the RAM 3002 by the CPU 3000 are executed by the CPU 3000.

FIG. 4 illustrates an example of the functional blocks of the control system according to the present exemplary embodiment.

The functional blocks of the printing apparatus 1002 related to calibration are described first. A sheet information storage unit 4008 stores sheet information regarding each of the types of sheet used for printing performed by the printing apparatus 1002. FIG. 5 illustrates an example of the sheet information stored in the sheet information storage unit 4008. As illustrated in FIG. 5, the sheet information contains a sheet ID 5000, a calibration eligible property 5001, a sheet name 5002, and a calibration target creation date and time 5003. The sheet ID 5000 is used to identify the type of sheet. The calibration eligible property 5001 indicates whether the sheet is a common calibration sheet, a unique calibration sheet, or a calibration ineligible sheet. In the calibration eligible property 5001 illustrated in FIG. 5, the term "common" indicates that the sheet is a common calibration sheet, the term "unique" indicates that the sheet is a unique calibration sheet, and the term "ineligible" indicates that the sheet is a calibration ineligible sheet. The sheet name 5002 indicates the name of the sheet specified when the sheet is shipped or the name given to a custom sheet. The sheet name 5002 is displayed on the operation unit 2009. The calibration target creation date and time 5003 indicates the date and time at which the calibration target data is created. Although not illustrated in FIG. 5, the sheet information further contains the height of the print head, sheet feed adjustment, the attraction force, a variety of table data used to the print processing, and the calibration target data. Note that according to the present exemplary embodiment, the printing apparatus has the calibration target value for a calibration eligible sheet among the sheets registered in the printing apparatus in advance. However, the configuration is not limited thereto. For example, the sheet information management unit 4002 may distribute, to each of the printing apparatuses, the calibration target value managed by the sheet information management unit 4002. Thus, the calibration target value for each of the sheet types may be registered in the printing apparatus. Note that the calibration target value can be registered for only a calibration eligible sheet. The target value can be registered afterward. In such a case, the date and time at which the target value is registered is set in the calibration target creation date and time 5003.

A calibration execution unit 4009 prints a predetermined patch and measures the patch using the above-described density sensor. Thus, the calibration execution unit 4009 calculates a correction value to obtain the calibration target data. The result of calculation by the calibration execution unit 4009 is stored in a calibration information storage unit 4010. FIG. 6 illustrates an example of calibration information stored in the calibration information storage unit 4010. The calibration information contains a sheet ID 6000, a sheet type in calibration 6001, a calibration execution date and time 6002, and a calibration state 6003. The sheet ID 6000 indicates an ID for identifying a sheet type. According to the present exemplary embodiment, if a plurality of sheet types each usable as a common calibration sheet are present, one of the types of sheet is selected as a "common calibration sheet" having a result of calibration that is applicable to the other types of sheet. Note that the term "ID_Common" in the sheet ID 6000 indicates that the sheet is the common calibration sheet for the printing apparatus. As described above, according to the present exemplary embodiment, for the printing apparatus, the common calibration sheet is only one, and ID_Common indicates that the sheet is the only one common calibration sheet. In each of the printing apparatuses, the result of calibration on ID_Common is applied to all the types of sheet that are not subjected to calibration.

A sheet type in calibration 6001 indicates the type of sheet used for the calibration. In FIG. 6, the sheet type "ID_Common" in the sheet ID 6000 indicates that calibration has been performed on a sheet having a type of ID_A. In addition, according to the present exemplary embodiment the calibration executed sheet type 6001, the sheet type "ID_A" in the sheet ID 6000 indicates that calibration has been performed on a sheet having a type of ID_A itself. In addition, the sheet type "ID_B" in the sheet ID 6000 indicates that calibration has been performed on a sheet having a type of ID_B itself. If each of common calibration and unique calibration has not been performed on the sheet, the sheet type in calibration 6001 corresponding to each of the values in the sheet ID 6000 has a value "-", which indicates that calibration has not been performed. That is, calibration has not been performed for the sheet types ID_C and ID_D in the sheet ID 6000. Accordingly, the result of the common calibration is applied to the sheets having sheet IDs of ID_C and ID_D.

The calibration execution date and time 6002 indicates the date and time at which the calibration was performed. The calibration state 6003 indicates the state of the sheet subjected to calibration using a value. The value varies with a print volume. In addition, the value is calculated for each of the printing apparatuses 1002, 1003, and 1004 on the basis of a reference value. In FIG. 6, the value indicates the state of calibration for the printing apparatus 1002. For example, the value in the calibration state 6003 is in the range from 0 to 100. If the value reaches a value greater than or equal to 80, the printing apparatus 1002 sends a message indicating that the calibration state is at "Level 1". If the value reaches a value greater than or equal to 85, the printing apparatus 1002 sends a message indicating that the calibration state is at "Level 2". If the value reaches a value greater than or equal to 90, the printing apparatus 1002 sends a message indicating that the calibration state is at "Level 3". In this manner, the user is aware of the level of the calibration state of the printing apparatus. The reference value is determined on the basis of, for example, the print volume and the color measured under a predetermined condition. The reference value may be obtained from an external apparatus or is prestored in the printing apparatus. In addition, according to the present exemplary embodiment, dot counting of ink ejected from the print head of the printing apparatus 1002 is used as the print volume. However, the print volume is not limited thereto. For example, a printing time may be used as the print volume. In the printing apparatus 1002, the calibration state 6003 may be calculated and updated at predetermined time intervals. Alternatively, the calibration state 6003 may be calculated and updated when the printing apparatus 1002 receives an inquiry from the server PC 1000. Note that if the sheet type in calibration 6001 is set to the above-described value "-", calibration has not been performed. Accordingly, each of the calibration execution date and time 6002 and the calibration state 6003 is also set to a value "-".

The functional blocks of the server PC 1000 illustrated in FIG. 4 are described next. A printing apparatus DB 4000 stores the setting values used to manage the printing apparatus 1002 and illustrated in FIGS. 10 and 11, which are described in more detail below. Even when the printing apparatuses 1002, 1003, and 1004 are located at different locations (e.g., in different stores), the printing apparatuses 1002, 1003, and 1004 can be managed in an integrated manner.

A printing apparatus management unit 4001 can search the network for the printing apparatus 1002 and manage the printing apparatus 1002, which is the target of management performed by the system, using the printing apparatus DB 4000. For example, the printing apparatus management unit 4001 stores, in the printing apparatus DB 4000, the setting values set using a screen illustrated in FIG. 11 (e.g., predetermined condition under which the calibration is performed for each of the printing apparatuses).

The sheet information management unit 4002 can distribute the sheet information to be registered in the sheet information storage unit 4008 of each of the printing apparatuses (e.g., the printing apparatus 1002). The sheet information to be distributed to each of the printing apparatuses is stored in a sheet information DB 4005 for each of the models (for each of the printing apparatuses). By distributing the sheet information for each of the models stored in the sheet information DB 4005 to the printing apparatus 1002, the server PC 1000 is synchronized with the printing apparatus 1002 using the same sheet information. The sheet information may be distributed from the sheet information management unit 4002 when the sheet information DB 4005 is updated. Alternatively, the sheet information may be distributed from the sheet information management unit 4002 at a predetermined schedule determined for each of the printing apparatuses. For example, the sheet information is distributed to the printing apparatus 1002 on Monday at 10:00 PM and is distributed to the printing apparatus 1003 and the printing apparatus 1004 on Tuesday at 10:00 PM.

A sheet state monitoring unit 4004 acquires, at predetermined time intervals, the information stored in the calibration information storage unit 4010 of the printing apparatus 1002, which is managed using the printing apparatus DB 4000. Thereafter, the sheet state monitoring unit 4004 updates part of the information illustrated in FIG. 10 (described in more detail below). A calibration execution unit 4006 monitors the printing apparatus DB 4000 at predetermined time intervals and determines whether the calibration state of the printing apparatus reaches a predetermined level.

A notification unit 4003 sends predetermined information to an e-mail address registered in the printing apparatus DB 4000 in response to a trigger event from the sheet information management unit 4002, the sheet state monitoring unit 4004, or the calibration execution unit 4006. Example of the predetermined information sent from the notification unit 4003 include information indicating that distribution of the sheet information is failed, information indicating that the calibration state of the printing apparatus reaches a predetermined level, and information indicating that execution of calibration is failed. For example, if the sheet information management unit 4002 fails distribution of the sheet information, the sheet information management unit 4002 generates an e-mail formed from the title and the body of the e-mail. Thereafter, the notification unit 4003 sends the e-mail generated by the sheet information management unit 4002 to the address registered in the printing apparatus DB 4000. For example, the sheet state monitoring unit 4004 generates an e-mail including a title and a body indicating that the calibration state 6003 of the printing apparatus 1002 reaches a predetermined level. Thereafter, the notification unit 4003 sends the e-mail generated by the sheet state monitoring unit 4004 to the address registered in the printing apparatus DB 4000. For example, the calibration execution unit 4006 generates an e-mail including a title and a body indicating that execution of calibration managed using a calibration execution queue DB 4007 is failed. Thereafter, the notification unit 4003 sends the e-mail generated by the calibration execution unit 4006 to the address registered in the printing apparatus DB 4000.

The web server 4012 allows the web browser 4011 of the client PC 1001 to access the functional blocks, such as the printing apparatus management unit 4001, the sheet information management unit 4002, the notification unit 4003, and the sheet state monitoring unit 4004.

FIG. 10 illustrates an example of a management screen delivered by the web server 4012 and displayed on the CRT display 3009 of the client PC 1001 by the web browser 4011. For example, the management screen is displayed on the client PC 1001 if the user accesses a management system (the server PC 1000) via the web browser 4011.

A printer name 10001 is acquired from each of the printing apparatuses by the printing apparatus management unit 4001 and is stored in the printing apparatus DB 4000. Note that the printer name 10001 of the printing apparatus 1002 may be freely determined by the user. The user can set the printer name by accessing a Web server (not illustrated) incorporated into the printing apparatus 1002 using the web browser 4011.

A product name 10002 is used to identify the model of the printing apparatus 1002. The product name 10002 is predetermined at the time of shipment of the printing apparatus 1002 and is not changed after shipment. The product name 10002 is acquired from the printing apparatus 1002 by the printing apparatus management unit 4001 and is stored in the printing apparatus DB 4000.

A calibration state 10003 indicates the calibration state identified on the basis of the value of the calibration state 6003 corresponding to ID_Common of the sheet ID 6000 acquired from the calibration information storage unit 4010 by the sheet state monitoring unit 4004. That is, the calibration state 10003 indicates the calibration state when the common calibration sheet is used in each of the printing apparatuses. According to the present exemplary embodiment, the calibration state can be at any one of the following four levels: "OK", "Level 1", "Level 2", and "Level 3". In addition, the value in percent is appended to the level in the calibration state 6003. More specifically, the value in the calibration state 6003 is displayed as, for example, Level 3 (95%), OK (10%), Level 2 (87%), or Level 1 (82%). Note that Level 1 is assigned if the value in the calibration state 6003 is greater than or equal to 80% and less than 85%, Level 2 is assigned if the value in the calibration state 6003 is greater than or equal to 85% and less than 90%, and Level 3 is assigned if the value in the calibration state 6003 is greater than or equal to 90%. In addition, OK is assigned if the value in the calibration state 6003 is less than 80%.

A calibration execution date and time 10004 is acquired from the printing apparatus 1002 by the sheet state monitoring unit 4004 and is stored in the printing apparatus DB 4000. The value of the calibration execution date and time 10004 is the same as the value in the calibration execution date and time 6002 corresponding to ID_Common of the sheet ID 6000 acquired from the calibration information storage unit 4010 by the sheet state monitoring unit 4004.

A schedule 10005 indicates the timing at which the calibration execution unit 4006 sends a calibration instruction to the printing apparatus 1002. Examples of the timing at which calibration instruction is sent include "AUTO", a specified day of month, a specified day of week, a specified point in time, and "immediately". When "AUTO" is set and if the calibration state 10003 is, for example, at a level of "Level 3", the calibration execution unit 4006 sends a calibration instruction to a target printing apparatus. In contrast, if "immediately" is set, the calibration execution unit 4006 immediately sends a calibration instruction to the target printing apparatus.

An update date and time 1006 indicates the date and time at which the sheet state monitoring unit 4004 updates the information illustrated in FIG. 10 on the basis of the information acquired from the calibration information storage unit 4010 by the sheet state monitoring unit 4004.

A common calibration sheet type 10007 is information regarding the type of the common calibration sheet used by a plurality of the printing apparatuses monitored by the system. The common calibration sheet type 10007 is acquired from each of the printing apparatuses by the sheet state monitoring unit 4004 and is stored in the printing apparatus DB 4000. More specifically, the value in the common calibration sheet type 10007 is the same as the value of the sheet type in calibration 6001 corresponding to ID_Common of the sheet ID 6000 acquired from the calibration information storage unit 4010 by the sheet state monitoring unit 4004. Although the sheet name 5002 is displayed on the CRT display 3009 as the common calibration sheet type 10007, the printing apparatus DB 4000 stores the ID indicated by the sheet type in calibration 6001. Note that if the value of the sheet type in calibration 6001 corresponding to ID_Common of the sheet ID 6000 is the above-described "-", "unexecuted" is displayed in the common calibration sheet type 10007. For example, if common calibration has never been executed in each of the printing apparatuses or if the calibration information storage unit 4010 is initialized, "unexecuted" is set as the value in the sheet type in calibration 6001 corresponding to ID_Common. If calibration is executed using the common calibration sheet in response to an instruction input to the operation unit 2009, an "unexecuted" state of ID_Common is cleared. For example, if common calibration has been executed using a common calibration eligible sheet at the time of installation of the printing apparatus 1002, the "unexecuted" state of ID_Common of the printing apparatus 1002 is cleared and the sheet type is displayed. That is, the common calibration eligible sheet that was used for the common calibration is set as a "common calibration sheet". Note that if the "unexecuted" is set in the common calibration sheet type 10007, each of the calibration state 10003 and the calibration execution date and time 10004 is displayed as, for example, "-".

A sheet information check 10008 indicates whether the sheet information stored in the sheet information DB 4005 for each of the models is the same as the sheet information stored in the sheet information storage unit 4008. For example, the determination is made by comparing a check SUM value of the sheet information data for each of the models stored in the sheet information DB 4005 and a SUM value in the sheet information stored in the sheet information storage unit 4008. The sheet state monitoring unit 4004 acquires the SUM value stored in the sheet information storage unit 4008 from each of the printing apparatuses and acquires the SUM value in the sheet information regarding each of the models from the sheet information DB 4005. Thereafter, the sheet state monitoring unit 4004 determines whether the two SUM values are the same. If the two SUM values are the same, "OK" is displayed in the sheet information check 10008 illustrated in FIG. 10. However, if the two SUM values are not the same, "mismatch" is displayed in the sheet information check 10008 illustrated in FIG. 10. An example of the case where the two SUM values are not the same is the case in which the sheet information in the sheet information DB 4005 has not been distributed to the sheet information storage unit 4008 due to, for example, a communication error. A date and time of update 10006 indicates the date and time of updating of the calibration state 10003, the calibration execution date and time 10004, the common calibration sheet type 10007, or the sheet information check 10008.

Note that the following items for each of the printing apparatuses are stored in the printing apparatus DB 4000. That is, the printer name 10001, the product name 10002, the network address information for IPv4 and IPv6, and the serial number of the printing apparatus are stored in the printing apparatus DB 4000. In addition, the most recent information regarding ID_Common of the sheet ID 6000 (hereinafter, the information is also referred to as "information S1") including the sheet type in calibration 6001, the calibration execution date and time 6002, and the calibration state 6003 is further stored. Furthermore, the second most recent information regarding ID_Common of the sheet ID 6000 (hereinafter, the information is also referred to as "information S2") including the sheet type in calibration 6001, the calibration execution date and time 6002, and the calibration state 6003 is stored. Still furthermore, the schedule 10005, the date and time of update 10006, and the sheet information check 10008 are stored. Yet still furthermore, information illustrated in FIG. 11 (described below) and calibration execution information indicating whether calibration needs to be executed are stored.

FIG. 11 illustrates an example of a setting screen that allows settings for each of printers to be edited. The setting screen is delivered by the web server 4012 and is displayed on the CRT display 3009 of the client PC 1001 by the web browser 4011. For example, the setting screen is displayed when the user inputs an instruction to display a setting menu on the CRT display 3009 via the web browser 4011. A check 11000 is in the form of a check box used to select a printing apparatus for which the setting values are edited. A printer name 11001 is similar to the printer name 10001 illustrated in FIG. 10. A product name 11002 is similar to the product name 10002 illustrated in FIG. 10. Note that the values in the printer name 11001 and the product name 11002 are not editable in FIG. 11. These values are displayed only for allowing the user to identify each of the printing apparatuses.

Each of Level 1 (11003), Level 2 (11004), and Level 3 (11005) can contain a threshold value used to determine the calibration state 10003. In addition, in Level 1 (11003), Level 2 (11004), and Level 3 (11005), notice on/off information can be set. In FIG. 11, "NOTICE: ON" is displayed in each of Level 1 (11003), Level 2 (11004), and Level 3 (11005), which indicates that if the calibration state reaches each of the Levels, a notification e-mail is sent. An expiration notice 11009 can contain the expiration notice ON/OFF setting. The expiration notice is sent at predetermined time intervals. According to the present exemplary embodiment, determination as to whether the notice is submitted is made at every monitoring timing. An e-mail including the notice is sent only once when the calibration state reaches each of the Levels. Unlike the notice of each of the Levels, the expiration notice 11009 is submitted at predetermined time intervals (e.g., every 24 hours). More specifically, if the expiration notice is set to ON and if Level 3 is not canceled even when 24 hours elapse after the calibration state reaches Level 3 (11005), the expiration notice is submitted.

Note that according to the present exemplary embodiment, the notice of Level 1 (11003), the notice of Level 2 (11004), the notice of Level 3 (11005), and the notice of the expiration notice 11009 are common to all the printing apparatuses to be monitored. However, the configuration is not limited thereto. For example, each of the notice settings may be set for one of the printing apparatuses selected in the check 11000. Note that if "NOTICE: OFF" is set, "-" can be displayed instead of the threshold value.

By using auto calibration 11006, execution of auto calibration can be set to ON or OFF. When the auto calibration 11006 is set to ON and if the calibration state reaches Level 3 (11006), the calibration execution unit 4006 sends, to the printing apparatus, a calibration instruction to execute calibration using a sheet indicated by the common calibration sheet type 10007.

By using schedule 11007, a schedule indicated by the schedule 10005 can be set. That is, for example, setting to automatically execute calibration, setting to execute calibration on a day of specified month, setting to execute calibration on the specified day of week, setting to execute calibration at a specified point in time, and setting to immediately execute calibration can be selected. Alternatively, one of the settings to execute calibration on a day of specified month, on the specified day of week, and at a specified point in time and the setting to automatically execute calibration can be specified at the same time. For example, the printer name "Name_B" illustrated in FIG. 11 has the setting to execute calibration when the calibration state reaches Level 3 (corresponding to "AUTO") and, in addition, execute calibration at the time "Aug. 1, 2014 10:00:00".

By using a destination address 11008, the e-mail address used by the notification unit 4003 to send information can be set.

Note that in FIG. 11, the variety of setting values are set for each of the printers. However, a plurality of the printing apparatuses may be grouped into a plurality of groups, and the setting values may be managed for each of the groups. When the setting values are managed for each of groups and if, as illustrated in FIG. 11, a setting value is "-", the setting value set for the group is selected as the destination address. In addition, if, as illustrated in FIG. 11, the setting value is changed for each of the printing apparatuses, the setting value set for the printing apparatus can have a priority. However, the configuration is not limited thereto. For example, the setting value set for the group and the setting value set for the printing apparatus may be used as the destination address 11008. Alternatively, the setting value set for the printing apparatus may have a priority.

Figure 7:
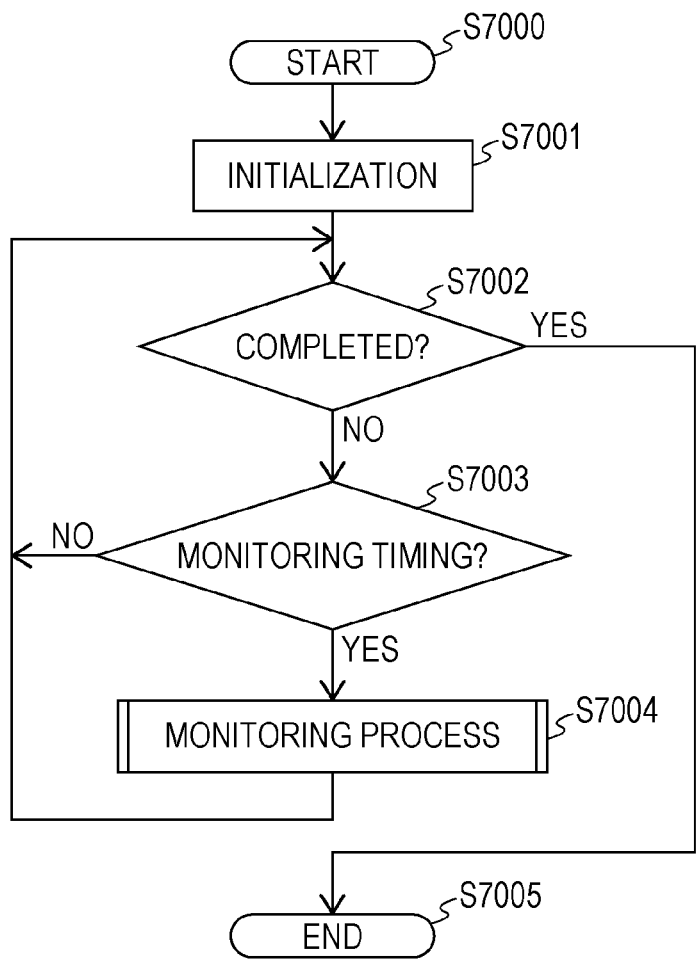
FIG. 7 illustrates the operation flow of a sheet state monitoring unit according to the first exemplary embodiment.

FIG. 7 illustrates the operation flow of the sheet state monitoring unit 4004. In the computer body 3007 which serves as the server PC 1000, the CPU 3000 loads a variety of programs, such as the control program, the system program, and the application program, from the ROM 3001 to the RAM 3002. Thereafter, the CPU 3000 executes the programs and performs a variety of data processing.

If the server PC 1000 is started, the sheet state monitoring unit 4004 starts monitoring (step S7000).

In step S7001, the sheet state monitoring unit 4004 performs an initialization process. For example, the sheet state monitoring unit 4004 reads a predetermined monitoring period from a setting file (not illustrated) and initializes the monitoring period. Examples of the setting of monitoring period include constant monitoring, monitoring from Monday to Friday from 8:00 A.M. to 10:00 P.M., and monitoring from Monday to Friday from 10:00 P.M. to 5:00 A.M. In addition, if, for example, monitoring is performed at predetermined intervals, the sheet state monitoring unit 4004 reads the value of the predetermined time interval from the setting file and initializes the value of the predetermined interval. Examples of a setting value of the predetermined interval include 10 minutes and 60 minutes. Note that the monitoring period and the predetermined time period may be set by the user as needed. In such a case, setting of the monitoring period and the predetermined time period for the sheet state monitoring unit 4004 may be carried out by the printing apparatus management unit 4001 via the web server 4012, and the user may set the values through the web browser 4011.

In step S7002, it is determined whether monitoring is completed. For example, if the server PC 1000 receives a shutdown preparation instruction from an operating system (not illustrated), it is determined that monitoring is to be completed (Yes in step S7002). Thus, monitoring is completed (step S7005). However, if it is determined that the monitoring is not to be completed (No in step S7002), the processing proceeds to step S7003, where it is determined whether the monitoring timing is reached (step S7003). For example, if the set predetermined time interval elapses during the monitoring period, it is determined that the monitoring timing is reached (Yes in step S7003) and, thus, the monitoring process is performed in step S7004. After the monitoring process is performed in step S7004, the processing returns to step S7002, where it is determined whether monitoring is to be completed. Alternatively, by pressing an update button (not illustrated in FIG. 10), it may be determined whether a monitoring timing is reached (Yes in step S7003).

Figure 8:
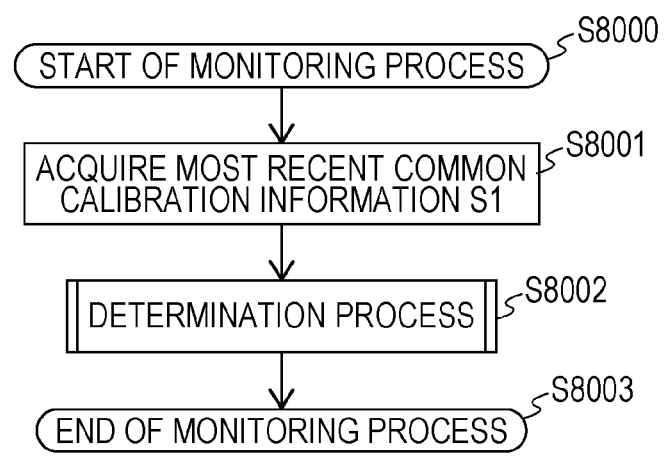
FIG. 8 illustrates an example of the flow of a monitoring process according to the first exemplary embodiment.

FIG. 8 illustrates the flow of the monitoring process performed in step S7004. If the monitoring process is started in step S8000, the sheet state monitoring unit 4004 acquires, from the calibration information storage unit 4010, the sheet type information used in the most recent common calibration (step S8001). The sheet type information used in the most recent common calibration acquired in step S8001 is the information regarding ID_Common of the sheet ID 6000. The printing apparatus DB 4000 copies the stored above-described most recent information S1 regarding the ID_Common of the sheet ID 6000 to the second most recent information S2 regarding ID_Common of the sheet ID 6000 and stores the information acquired in step S8001 as the most recent information S1. Subsequently, in step S8002, a determination process (described below with reference to FIG. 9) is performed and, thereafter, the monitoring process is completed (step S8003).

Figure 9:
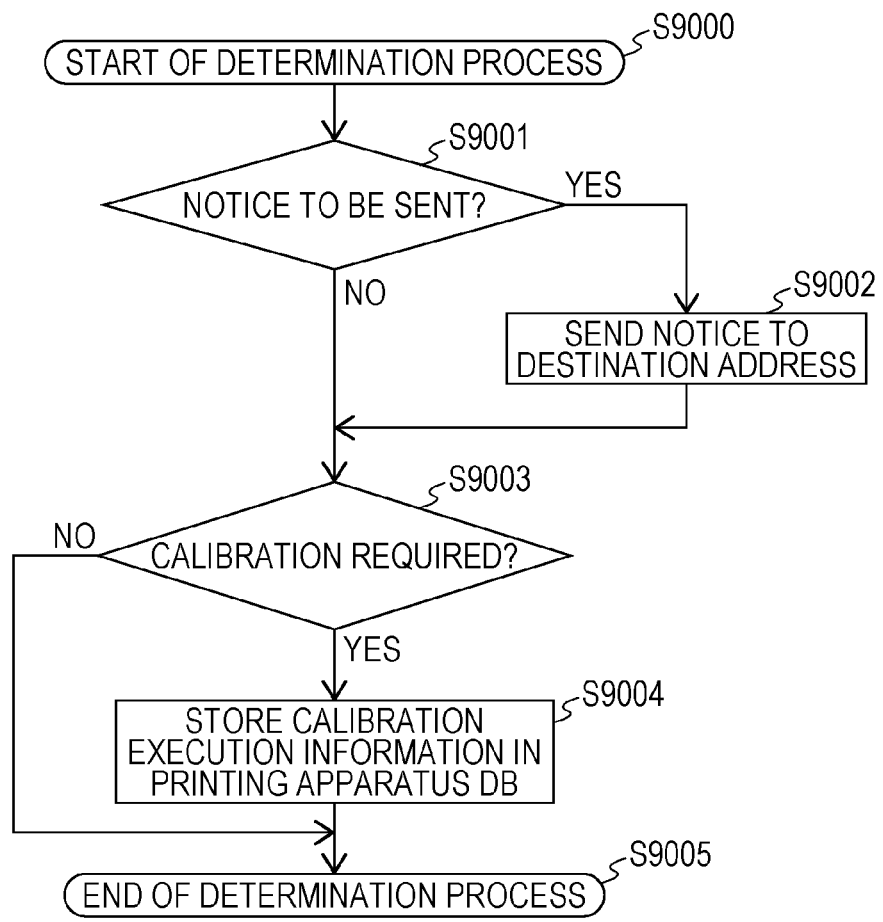
FIG. 9 illustrates the flow of a determination process according to the first exemplary embodiment.

FIG. 9 illustrates the flow of the determination process performed in step S8002. The determination process starts in step S9000. In step S9001, it is determined whether a notice is to be sent. The determination performed in step S9001 is made using the most recent information S1 regarding ID_Common of the sheet ID 6000 and the second most recent information S2 regarding ID_Common of the sheet ID 6000. That is, in step S9001, the determination as to whether a notice is sent is made on the basis of the difference between the most recent information S1 and the second most recent information S2. More specifically, if the calibration state 6003 in the second most recent information S2 is in the range from 0 to 79 and the calibration state 6003 in the most recent information S1 is in the range from 80 to 84, the calibration state is at Level 1. If the notice of Level 1 is ON, it is determined that the notice is sent. If the calibration state 6003 in the second most recent information S2 is in the range from 0 to 84 and the calibration state 6003 in the most recent information S1 is in the range from 85 to 89, the calibration state is at Level 2. If the notice of Level 2 is ON, it is determined that the notice is sent. If the calibration state 6003 in the second most recent information S2 is in the range from 0 to 89 and the calibration state 6003 in the most recent information S1 is in the range from 90 to 100, the calibration state is at Level 3. If the notice of Level 3 is ON, it is determined that the notice is sent. However, if there is no difference between the most recent information S1 and the second most recent information S2 or if the most recent information S1 corresponding to ID_Common of the sheet ID 6000 is "-" (that is, if calibration has not been executed), it is determined that a notice is not given.

If it is determined that a notice is required (Yes in step S9001), the notice is sent to the destination address 11008 (step S9002). Thereafter, processing proceeds to step S9003. However, if it is determined that a notice is not required (No in step S9001), the processing immediately proceeds to step S9003.

Figure 12:
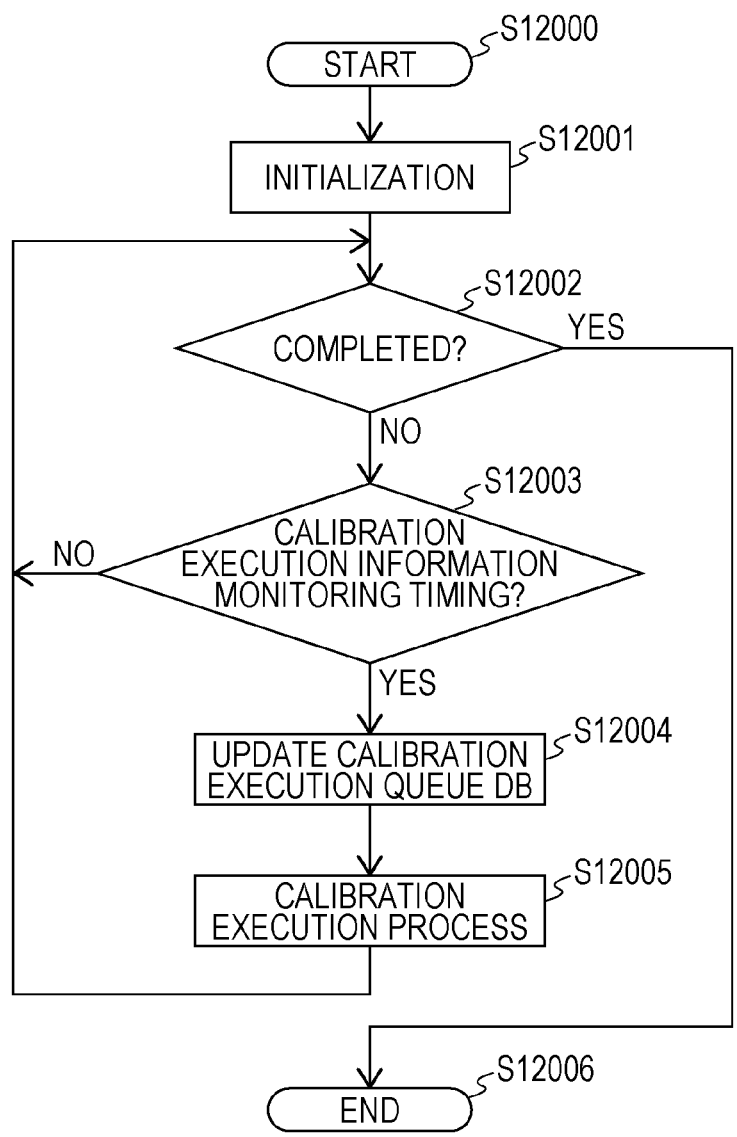
FIG. 12 illustrates an example of the operation flow of a calibration execution unit according to the first exemplary embodiment.

In step S9003, it is determined whether execution of common calibration is required. More specifically, if the most recent information S1 is at Level 3 and auto calibration is set, it is determined that execution of common calibration is required. If, in step S9001, it is determined that the most recent information S1 is at Level 3 and the auto calibration 11006 is set to ON, it is determined that execution of common calibration is required (Yes in step S9003). Thereafter, the processing proceeds to step S9004, where the calibration execution information is set to "Yes" and is stored in the printing apparatus DB 4000. Thereafter, the determination process is completed. However, if, in step S9003, it is determined that calibration is not needed (more specifically, if, in step S9001, the most recent information S1 is not at Level 3 or if the auto calibration 11006 is not set to ON), the determination process is completed (step S9005). FIG. 12 illustrates the flow of the processing performed by the calibration execution unit 4006. The calibration execution unit 4006 reads the calibration execution information stored in the printing apparatus DB 4000 at predetermined time intervals and performs calibration on each of the printing apparatuses. In the computer body 3007 serving as the server PC 1000, the CPU 3000 loads a variety of programs, such as the control program, the system program, and the application program, from the ROM 3001 to the RAM 3002. Thereafter, the CPU 3000 executes the programs and performs a variety of data processing.

If the server PC 1000 is started, a calibration execution process starts (step S12000). In step S12001, the calibration execution unit 4006 performs an initialization process. For example, when the calibration execution unit 4006 reads the printing apparatus DB 4000 at the predetermined time intervals, the calibration execution unit 4006 reads the predetermined time interval from the setting file and initializes the predetermined time interval. Examples of the predetermined time interval include 6 hours and 1 hour. Note that the setting of the predetermined time interval may be carried out by the user. In such a case, setting of the predetermined time interval used by the calibration execution unit 4006 can be carried out via the web server 4012, and the user can set the values through the web browser 4011.

In step S12002, it is determined whether an execution process is to be completed. For example, if the server PC 1000 receives a shutdown preparation instruction from an operating system (not illustrated), it is determined that the execution process is to be completed (Yes in step S12002). Thus, the execution process is completed (step S12006). However, if, in step S12002, it is determined that the execution process is not to be completed (No in step S12002), the processing proceeds to step S12003, where it is determined whether the monitoring timing in the calibration execution information is reached. For example, if the predetermined period of time set in the calibration execution unit 4006 has elapsed, it is determined that the monitoring timing in the calibration execution information is reached (Yes in step S12003). However, if the predetermined period of time set in the calibration execution unit 4006 has not elapsed, it is determined that the monitoring timing of the calibration execution information is not reached (No in step S12003).

However, if, in step S12003, it is determined that the monitoring timing is reached (Yes in step S12003), the calibration execution unit 4006 reads the calibration execution information regarding each of the printing apparatuses stored in the printing apparatus DB 4000 in step S9004 (step S12004). If the calibration execution information read for the printing apparatus is "Yes", the calibration execution unit 4006 stores, in the calibration execution queue DB 4007, information used for identifying the printing apparatus and read from the printing apparatus DB 4000. The calibration execution queue DB 4007 stores the serial number used for identifying the printing apparatus and the sheet type in calibration 6001.

In step S12005, an instruction to perform a calibration execution process is sent to the printing apparatus having the identification information stored in the calibration execution queue DB 4007. Thereafter, the processing returns to step S12002.

If, in step S12005, the calibration execution unit 4006 sends a calibration execution instruction to the printing apparatus to be calibrated among the printing apparatuses to be monitored, the calibration execution unit 4006 determines whether a sheet of the sheet type in calibration 6001 is fed to the printing apparatus to be calibrated. If the sheet is fed, a calibration execution instruction is sent. However, if a sheet of the calibration executed sheet type 6001 is not fed, it is continuously determined whether the sheet is fed to the printing apparatus to be calibrated at predetermined intervals until the set predetermined period of time elapses. For example, feed information is checked at 10-minute intervals until 3 hours elapse. If 3 hours elapse, a timeout occurs and, thus, the processing is completed. If the execution of calibration is completed due to a timeout and the calibration execution information is "Yes" at the next timing of monitoring the calibration execution information, execution of calibration is attempted again. The calibration execution unit 4006 monitors the calibration execution process to determine whether the calibration execution process succeeds or fails. If, in step S12005, the calibration execution process succeeds, fails, or is completed due to a timeout, the serial number and the sheet type in calibration 6001 of the printing apparatus to be calibrated are deleted from the calibration execution queue DB 4007. In addition, the calibration execution information regarding the printing apparatus stored in the printing apparatus DB 4000 is updated to "No".

If, in step S12005, the information regarding a plurality of the printing apparatuses is stored in the calibration execution queue DB 4007, the calibration execution processes for the plurality of printing apparatuses may be performed in parallel.

According to the present exemplary embodiment, if common calibration is performed for the printing apparatus to be monitored at least once, calibration can be performed for the printing apparatus to be monitored using a sheet of a type used in the most recent common calibration. More specifically, calibration is performed using a sheet of a type used in the most recent common calibration for each of the printing apparatuses to be monitored on the basis of the value in the calibration state 6003 at a predetermined timing. In this manner, the color correction states of the printing apparatuses to be monitored can be kept unchanged without a troublesome operation.

Second Exemplary Embodiment

Another exemplary embodiment that differs from the first exemplary embodiment is described in detail below with reference to the accompanying drawings. Note the same elements as those illustrated and described in relation to the first exemplary embodiment are designated by the same reference numerals, and descriptions of the elements are not repeated.

In the first exemplary embodiment, calibration is performed on the printing apparatus to be monitored using the information regarding a common calibration sheet indicated by ID_Common of the sheet ID 6000. According to the present exemplary embodiment, the common calibration sheet is temporarily changed for the printing apparatus. That is, for the predetermined period of time, the common calibration sheet indicated by ID_Common of the sheet ID 6000 is changed, and the calibration is performed.

More specifically, the following example illustrates such a case. In the example, calibration is usually performed using ID_A of the sheet ID 5000 in a store, and sheets of a type of ID_A run out. In such a case, in general, the common calibration is temporarily performed using a sheet of a type of ID_B. Thereafter, common calibration is performed using a sheet of a type of ID_A again. In this case, for a predetermined period of time, ID_Common of the sheet ID 6000 is ID_B, and the calibration is performed using a sheet of a type of ID_B. Accordingly, even when ID_Common is changed to ID_A, the result of the common calibration is not applied to a sheet of a type of ID_B. According to the present exemplary embodiment, if a predetermined condition is met (if Level 3 is reached) for each of a sheet of a type of ID_Common and a sheet of a type left in a history of execution of calibration, calibration is performed. That is, calibration is performed using a sheet of a type of ID_A and, in addition, calibration is performed using a sheet of a type of ID_B.

As another example, in a store, a sheet of the sheet ID 5000 of ID_B has been used as a sheet used for the common calibration. However, the usually used sheet type is changed to the sheet ID 5000 of a type of ID_A. Even in such a case, like the above-described case, the execution history of calibration on ID_B still remains and, thus, the result of the common calibration performed on ID_Common is not applied to sheets of a sheet type of ID_B. As described above, according to the present exemplary embodiment, if the predetermined condition is met (Level 3 is reached) for each of a sheet of a type of ID_Common and a sheet of a type having a history of execution of calibration, calibration is performed. Accordingly, calibration is performed using a sheet of a type of ID_A and, in addition, calibration is performed using a sheet of a type of ID_B.

Figure 13:
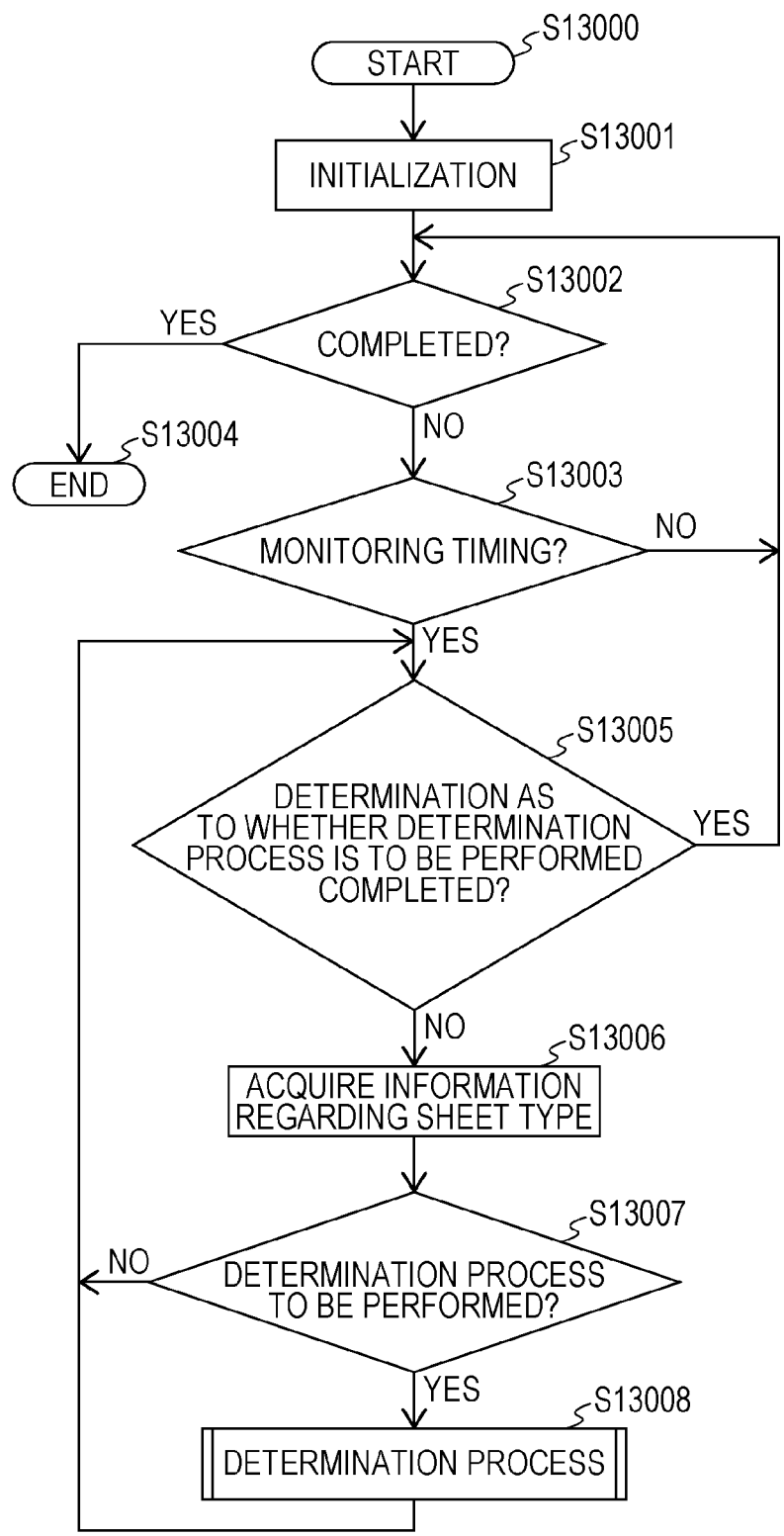
FIG. 13 illustrates an example of the operation flow of a sheet state monitoring unit according to a second exemplary embodiment.

FIG. 13 illustrates the flow of the process performed by the sheet state monitoring unit 4004 according to the present exemplary embodiment. If the server PC 1000 is started, a monitoring process performed by the sheet state monitoring unit 4004 starts (step S13000). In step S13001, the sheet state monitoring unit 4004 performs an initialization process. Since the initialization process is similar to that in step S7001 illustrated in FIG. 7, description of the initialization process is not repeated.

Subsequently, in step S13002, it is determined whether the monitoring process is to be completed. Since the determination made in step S13002 as to whether the monitoring process is to be completed is similar to that in step S7002 illustrated in FIG. 7, description of the determination is not repeated. If, in step S13002, it is determined that the monitoring process is to be completed, the processing is completed (step S13004).

However, if, in step S13002, it is determined that the monitoring process is not to be completed (No in step S13002), it is determined whether a monitoring timing is reached (step S13003). The determination made in step S13003 as to whether a monitoring timing is reached is similar to that in step S7003 illustrated in FIG. 7, description of the determination is not repeated. If, in step S13003, it is determined that a monitoring timing is not reached (No in step S13003), the processing returns to step S13002.

However, if, in step S13003, it is determined that a monitoring timing is reached (Yes in step S13003), it is determined in step S13005 whether determination as to whether the determination process of the calibration information for each of the sheet types is to be performed is completed. In step S13005, the sheet types contained in the sheet ID 6000 stored in the calibration information storage unit 4010 are sequentially searched for to determine whether determination as to whether the determination process is to be performed is completed.

If, in step S13005, search of all the pieces of calibration information contained in the sheet ID 6000 is completed (Yes in step S13005), the processing returns to step S13002.

However, if, in step S13005, search of all the pieces of calibration information contained in the sheet ID 6000 is not completed (No in step S13005), the information regarding the sheet ID 6000 illustrated in FIG. 6 and the corresponding information regarding the sheet type in the sheet ID 5000 illustrated in FIG. 5 are acquired (step S13006). Let T denote a sheet of a sheet ID in the sheet ID 6000 which is a target of the determination process. In step S13007, it is determined whether the determination process is to be performed on the sheet T identified in step S13006. For example, if the sheet T is a common calibration sheet, that is, if the sheet T is ID_Common, it is determined that the determination process is to be performed. Since, in FIG. 6, the sheet type information is contained in the sheet type in calibration 6001 corresponding to ID_Common, it is determined that the determination process is to be performed. Furthermore, when the sheet T is not ID_Common but a calibration eligible sheet, it is also determined that the determination process is to be performed. For example, the flowing case is such a case. That is, the calibration eligible property 5001 is "common" and the sheet type in calibration 6001 differs from the sheet type in calibration 6001 of ID_Common. In FIG. 6, "ID_B" satisfies such a condition, and it is determined that the determination process is to be performed. Since ID_B has information for the sheet type and the information differs from that of ID_Common, it can be seen that ID_B was ID_Common for a certain period of time.

For ID_A, the calibration eligible property 5001 is "common" and the sheet type in calibration 6001 is the same as the sheet type in calibration 6001 of ID_common. Accordingly, it is determined that the determination process is not to be performed. This is because the determination process has already been performed on ID_A in the determination process for ID_Common. For ID_C, it is determined that the determination process is not to be performed since ID_C does not have the sheet type in calibration 6001. The process in step S13008 is similar to the determination process in step S8002 illustrated in FIG. 8. Accordingly, description of the process in step S13008 is not repeated. In the determination process, if it is determined that a notice is sent, the notice is sent. In addition, in the determination process, if it is determined that calibration is required, the calibration is executed in the calibration execution process. After the determination process in step S13008 is completed, the processing returns to step S13005, where it is determined whether the determination process is to be performed until the last entry in the sheet ID 6000 is reached. If, in step S13005, it is determined that the determination is completed, the processing returns to step S13002.

By using the flow of the processing performed by the sheet state monitoring unit 4004 illustrated in FIG. 13, calibration can be performed using a common calibration sheet and, in addition, calibration can be performed using a calibration eligible sheet that has been served as a common calibration sheet before. In addition, the notice of each of the Levels can be sent.

According to the present exemplary embodiment, even when a sheet used for common calibration is changed, calibration can be performed using a common calibration eligible sheet that has been used for common calibration before. In this manner, the color correction state of the printing apparatus can be maintained unchanged for the sheet type of common calibration eligible sheet that has been used for common calibration before.

Other Exemplary Embodiments

The present invention is not limited to the above-described exemplary embodiments. For example, while the first and second exemplary embodiments have been described with reference to the print system including the server PC 1000, the client PC 1001, and the printing apparatus 1002, the configuration of the print system is not limited thereto. For example, some or all of the function units of the server PC 1000 and the client PC 1001 illustrated in FIG. 4 may be implemented in at least one of the printing apparatuses to be monitored. In such a case, each of the printing apparatuses may manage only one printing apparatus or may additionally manage another printing apparatus.

Advantageous Effect of the Invention

According to the present invention, by examining the color correction state of a unique sheet type, the color correction states of the printing apparatuses can be maintained consistent without a user instruction to execute calibration.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control system for controlling execution of calibration on a printing apparatus, comprising:
an acquiring unit configured to acquire, from a printing apparatus to be controlled, first sheet type information representing information regarding a common calibration sheet type used when a most recent common calibration was executed, a result of common calibration executed using the common calibration sheet type being applied to other sheet types;
a determination unit configured to determine whether a state of the printing apparatus for a first sheet type specified by the first sheet type information satisfies a predetermined condition in accordance with a print volume of the printing apparatus; and
a control unit configured to cause the printing apparatus to execute calibration using the first sheet type if the determination unit determines that the predetermined condition for the first sheet type is satisfied.

2. The control system according to claim 1, wherein the acquiring unit further acquires second sheet type information regarding a second sheet type different from the first sheet type, where common calibration has been executed for the second sheet type before,
wherein the determination unit further determines whether a state of the printing apparatus for the second sheet type satisfies the predetermined condition, and
wherein the control unit causes the printing apparatus to execute calibration using the second sheet type if the determination unit determines that the predetermined condition for the second sheet type is satisfied.

3. The control system according to claim 1, further comprising:
a monitoring unit configured to monitor a calibration state of one or more printing apparatuses to be monitored.

4. The control system according to claim 3, further comprising:
a notification unit configured to send a notice in accordance with a calibration state of the printing apparatus monitored by the monitoring unit.

5. The control system according to claim 1, further comprising:
a display control unit configured to cause a display unit to display information indicating that the common calibration has yet not been executed if the first sheet type information is not present in the printing apparatus.

6. The control system according to claim 1, further comprising:
a management unit configured to manage the predetermined condition for each of a plurality of the printing apparatuses,
wherein the determination unit makes the determination on the basis of the predetermined condition managed by the management unit for each of the printing apparatuses.

7. The control system according to claim 6, wherein the management unit manages a timing at which calibration is executed for each of the printing apparatuses to be controlled.

8. The control system according to claim 1, further comprising:
the printing apparatus.

9. A control apparatus for controlling execution of calibration on a printing apparatus, comprising:
an acquiring unit configured to acquire, from a printing apparatus to be controlled, first sheet type information representing information regarding a common calibration sheet type used when a most recent common calibration was executed, a result of common calibration executed using the common calibration sheet type being applied to other sheet types;
a determination unit configured to determine whether a state of the printing apparatus for a first sheet type specified by the first sheet type information satisfies a predetermined condition in accordance with a print volume of the printing apparatus; and
a control unit configured to cause the printing apparatus to execute calibration using the first sheet type if the determination unit determines that the predetermined condition for the first sheet type is satisfied.

10. A control method comprising:
acquiring, from a printing apparatus to be controlled, first sheet type information representing information regarding a common calibration sheet type used when a most recent common calibration was executed, a result of common calibration executed using the common calibration sheet type being applied to other sheet types;
determining whether a state of the printing apparatus for a first sheet type specified by the first sheet type information satisfies a predetermined condition in accordance with a print volume of the printing apparatus; and
causing the printing apparatus to execute calibration using the first sheet type if the determination unit determines that the predetermined condition for the first sheet type is satisfied.

11. A non-transitory computer-readable recording medium storing a program comprising program code that causes a computer to perform a control method comprising:
acquiring, from a printing apparatus to be controlled, first sheet type information representing information regarding a common calibration sheet type used when a most recent common calibration was executed, a result of common calibration executed using the common calibration sheet type being applied to other sheet types;
determining whether a state of the printing apparatus for a first sheet type specified by the first sheet type information satisfies a predetermined condition in accordance with a print volume of the printing apparatus; and
causing the printing apparatus to execute calibration using the first sheet type if the determination unit determines that the predetermined condition for the first sheet type is satisfied.

* * * * *